United States Patent Office 3,012,989
Patented Dec. 12, 1961

3,012,989
POLYURETHANES OF POLYALKOXY
ACETAL-BISPHENOLS
Robert Steckler, Chagrin Falls, Ohio, Jesse Werner, Holliswood, N.Y., and Frederick A. Hessel, Montclair, N.J., assignors to General Aniline & Film Corporation, New York, N.Y., a corporation of Delaware
No Drawing. Filed Sept. 30, 1958, Ser. No. 764,236
6 Claims. (Cl. 260—47)

The present invention relates to polyurethanes and particularly to new polyurethanes of polyalkoxy acetal-bisphenols that are useful in the preparation of a diversified number of new and useful commercial products.

We have found that organic di- and poly-isocyanates react with polyalkoxy acetal-bisphenols to yield polyurethanes which are useful in the preparation of new types of chemical compounds and compositions, such as in the preparation of rigid-, semi-rigid and flexible foams, rubbers, adhesives, coatings and the like. The polyalkoxy acetal-bisphenols that are reacted with an organic di- or poly-isocyanate are characterized by the following general formula:

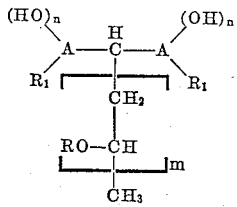

wherein A represents an aryl group, e.g. phenyl, diphenyl, naphthyl or anthracyl, R represents an alkyl radical of 1 to 5 carbon atoms, e.g. methyl, ethyl, propyl, isopropyl, butyl, amyl, etc., $R_1$ represents an alkyl group of 1 to 18 carbon atoms, e.g. methyl, ethyl, propyl, butyl, amyl, hexyl, octyl, nonyl, di-octyl, di-nonyl, decyl, dodecyl, stearyl, etc., hydrogen, $n$ represents 1 to 3 and $m$ represents 2 to 30, $n$ being 1 to 3 when A is phenyl, 1 to 2 when A is either diphenyl or naphthyl and 1 only when A is anthracyl.

The nature or character of the substituted or unsubstituted monohydric phenol or polyhydric phenol compound, which is condensed with the polyalkoxy acetal is immaterial so long as it contains at least one and not more than 3 hydroxy groups. The nature or character of substituents other than hydroxy is likewise immaterial, and the aryl nucleus of such monohydric phenol or polyhydric phenol compound may contain one or more substituents such as alkyl of 1 to 18 carbon atoms, halogen, i.e. chlorine or bromide, amino group, amide, carboxyl, chlormethyl, nitro, nitrile, alkylamide, etc., the only absolute prerequisite being that the mono- or polyhydric phenol compound contain a reactive hydrogen atom attached to the aryl nucleus. To illustrate this where A in the foregoing general formula is a phenyl ring derived from phenol:

One of the positions 1, 3 or 5 must be hydroxy and the remaining positions, including 2 and 4, may be hydrogen, hydroxy, alkyl, phenyl, alkoxy, amino, halogen, nitro, etc. or any of the other substituents referred to above.

As illustrative of such monohydric and polyhydric phenol compounds, the following may be mentioned: phenol, o-, m-, and p-cresol, chlorophenols, nitrophenols, aminophenols, ethyl phenol, isopropyl phenol, butyl phenol, tertiary butyl phenol, hexyl phenol, octyl phenol, decyl phenol, dodecyl phenol, tridecyl phenol, diisobutyl phenol, nonyl phenol, dinonyl phenol, 3-pentadecyl phenol, stearyl phenol, 2,4- and 3,5-xylenol, cardanol, α and β-naphthols, 2- and 9-hydroxy anthracene, orcinol, catechol, pyrocatechol, resorcinol, methyl resorcinol, 2-aminoresorcinol, hydroquinone, 2-hydroxy-hydroquinone, pyrogallol, phloroglucinol, methyl phloroglucinol, 4,4'-dihydroxy diphenol, 1,5-dihydroxy naphthalene and the like. It is to be noted that cardanol is a technical grade of anacardol having the formula:

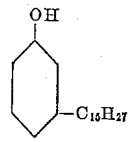

wherein the $C_{15}$ side chain contains two double bonds and is linear.

The polyalkoxy acetals which are condensed with any one of the foregoing monohydric and polyhydric phenol compounds or mixtures thereof are characterized by the following general formula:

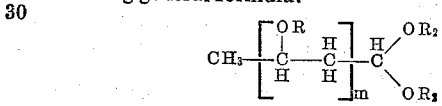

wherein $m$ and R have the same values as above and wherein $R_2$ represents an alkyl group of from 1 to 5 carbon atoms, e.g. methyl, ethyl, propyl, isopropyl, butyl, isobutyl, amyl, etc.

Illustrations of such polyalkoxy acetals, the following may be mentioned:

1,1,3,5-tetramethoxy hexane
1,1,3,5-tetraethoxy hexane
1,1-diethoxy,3,5-dimethoxy hexane
1,1,3,5,7-pentamethoxy octane
1,1,3,5,7,9-hexamethoxy decane
1,1,3,5,7,9,11-heptamethoxy dodecane
1,1,3,5,7,9,11,13-octamethoxy tetradecane
1,1,3-trimethoxy-5-ethoxy hexane
1,1-dimethoxy-3,5-ethoxy hexane
1,1-dimethoxy-3,5,7-ethoxy octane
polyalkoxy acetal obtained by condensing 1 mole of methanol with 30 moles of vinyl methyl ether It is to be noted that the higher polyalkoxy acetals may be obtained by employing 1 mole of either ethanol, propanol, butanol, monoethers of glycols, or any aromatic alcohol instead of methanol.

It is to be further noted that a mixture of two or more of the foregoing specific polyalkoxy acetals may be condensed with a mono- or polyhydric phenol. The ratio of the polyalkoxy acetals constituting the mixture is immaterial as only 1 molecular equivalent thereof is reacted with 2 molecular equivalents of the mono- or polyhydric phenol.

The foregoing polyalkoxy acetals and numerous species thereof are prepared in accordance with the methods disclosed in U.S. Patents 2,165,962 and 2,487,525. The methods of their preparation and the various species disclosed therein, which conform to the foregoing general formula, are incorporated herein by reference thereto.

From a visual inspection of the general formula of the polyalkoxy acetal-bisphenols, it will be noted that the aryl nuclei characterized by A are joined by a carbon atom bearing a polyalkoxy alkane chain as a substituent instead of the conventional alkane chain ranging from 1 to 5 carbon atoms. The presence of the polyalkoxy alkane chain in the bisphenol compounds provides increased reactivity with organic di- and polyisocyanates to yield a new class of polyurethanes having manifold uses in industry.

The polyalkoxy acetal-bisphenols which are utilized in accordance with the present invention are prepared by condensing 2 moles of a monohydric or polyhydric phenol with 1 mole of a polyalkoxy acetal of the foregoing general formula, as disclosed in our pending application Serial No. 764,231 filed on even date, the complete disclosure of which, particularly Examples I to XII, are incorporated herein by reference thereto.

The polyurethanes prepared from the foregoing polyalkoxy acetal-bisphenols are obtained by reacting 1 mole of the polyalkoxy acetal-bisphenol with 1 to 4 moles of an organic di- or polyisocyanate in a non-reactive organic solvent. The reaction is conducted by dissolving the bisphenol in a non-reactive solvent, such as for example, carbon tetrachloride, chloroform, esters such as ethyl acetate, methyl Cellosolve acetate and the like which are normally employed as solvents for polyurethanes. In this connection, it is to be noted that the nature or character of the solvent is immaterial so long as it is free from active hydrogen. This precludes solvents such as water, alcohols and the like. No difficulty will be encountered in the practice of this invention since the solvent system for the polyalkoxy acetal bisphenol and the di- or poly-isocyanate is in general similar to that used for lacquer coatings. These include esters, ketones and aromatic solvents which are well known. Only those esters and ketones should be utilized which are essentially free from alcohol, acid and water contaminants. After the addition of the bisphenol, 1 to 4 moles of an organic di- or poly-isocyanate are blended and to the resulting mixture there is added a trace, usually less than 1% of a strong tertiary amine such as N-methyl or N-ethyl morpholine, N-diethanolamine, and the like and depositing a film in the usual manner.

As examples of organic di- and poly-isocyanates which may be reacted with the polyalkoxy acetal-bisphenols, the following are illustrative:

Butylene-1,3-diisocyanate
Butylene-2,3-diisocyanate
Cyclo-hexylene-1,2-diisocyanate
Dianisidine diisocyanate
Hexamethylenediisocyanate
m-Phenylenediisocyanate
p-Phenylenediisocyanate
o-Phenylenediisocyanate
2,4-toluenediisocyanate
2,6-toluenediisocyanate
Methylene-bis(4-phenylisocyanate)
1-chloro-2,4-phenylenediisocyanate
Diphenyl-3,3'-dimethyl-4,4'-diisocyanate
Diphenyl-3,3'-dimethoxy-4,4'-diisocyanate
1,3-Phenylene diisocyanate
p-Dixylyl methane-4,4'-diisocyanate
1-methyl-phenylene-2,4-diisocyanate
Naphthalene 1,4-diisocyanate
Naphthalene 1,5-diisocyanate
Xylylenediisocyanate
4,4',4''-triphenyl methane triisocyanate
Benzene-1,2,4-triisocyanate
Triisocyanate made from p-fuchsin 3,3'-bitolylene-4,4'-diisocyanate
Diphenylmethane-4,4'-diisocyanate
Meta-phenylene diisocyanate
Bitolylene diisocyanate (3,3'-dimethyl-4,4'-biphenylenediisocyanate)
Diphenylxenylene diisocyanate (3,3'-diphenyl-4,4'-biphenylenediisocyanate)
Polymethylene polyphenylisocyanate
Xenylene diisocyanate (4,4'-biphenylenediisocyanate)
Dichloroxenylene diisocyanate (3,3'-dichloro-4,4'-biphenylenediisocyanate)
1-chloro-2,4-phenylene diisocyanate
m-Phenylene diisocyanate
p-Phenylene diisocyanate
4,4'-methylenebis (phenyl isocyanate)
4,4'-methylenebis (2-methylphenyl isocyanate)
2,2',5,5'-tetramethyl-4,4'-biphenylene diisocyanate With regard to the foregoing di- and poly-isocyanates, it is to be noted that the nature or character of one or more substituents in the aliphatic chain or in the aromatic ring is immaterial. All such compounds, whether substituted or unsubstituted, are readily reactive with the polyalkoxy acetal-bisphenols characterized by the foregoing general formula. It is to be further noted that with respect to tolylene diisocyanate the commercially available product containing a mixture of 35–65% of the 2,6- and 2,4-isomers respectively, may also be employed. In addition, tolylene diisocyanate containing 80% of the 2,4-isomer and 20% of the 2,6-isomer may be employed instead of the straight 2,4-tolylene diisocyanate.

Instead of reacting the above di- and poly-isocyanates with the polyalkoxy acetal-bisphenols of the foregoing general formula, it is also possible to react the said diisocyanate with polyalkoxy acetal-bisphenols that had been further reacted with 1 to 30 moles of ethylene oxide by conventional means. In this reaction, 100 parts of the polyalkoxy acetal-bisphenols characterized by the foregoing general formula and as exemplified by the products of Examples I to XII inclusive of our pending application referred to above, and 1 part of potassium hydroxide, ethylene oxide is bubbled through at approximately 160° C. until a weight increase of 15 to 30 parts is obtained. This reaction normally takes about 4 hours. Instead of utilizing ethylene oxide, propylene oxide may also be employed, but in such case the reaction is carried out at super-atmospheric pressure in order to obtain a product containing more than 1 mole of propylene oxide per each phenolic hydroxyl. If only 1 mole of propylene oxide is desired then propylene carbonate may be used in lieu of propylene oxide. The resulting product is characterized by the following general formula:

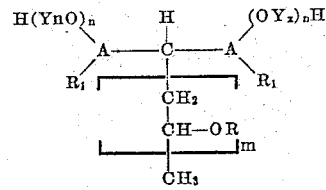

wherein Y represents either a —$CH_2CH_2O$— or —$CH_2CH_2CH_2O$— group, $x$ represents a positive integer ranging from 2 to 30, and R, $R_1$, $m$, and $n$ have the same values as above.

The following examples, which are merely illustrative, will show the preparation of the polyurethanes of polyalkoxy acetal-bisphenols. All parts are given by weight.

*Example I*

20 parts of the polyalkoxy acetal-bisphenol of Example I of our aforementioned pending application, were dissolved in 30 parts of ethyl acetate and mixed intimately with 6 parts of 2,4-tolylene diisocyanate. To this solution there was then added 0.1 part of dimethyl ethanolamine and the resulting solution cast on a steel surface.

Approximately after 1 hour at room temperature, an exceptional abrasion-resistant and adherent film was obtained. The solution from which this film was cast gelled in less than 1 hour. During the reaction of the bisphenol compound with the 2,4-tolylene diisocyanate a complex polymeric product is obtained which may be, for purposes of illustration, characterized by the following general formula:

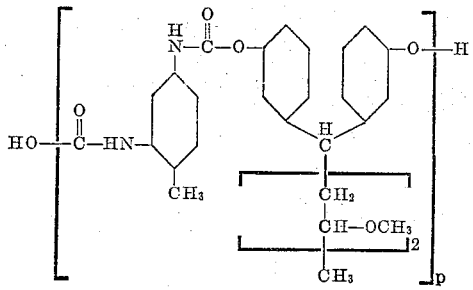

wherein $p$ represents the extent of condensation or polymerization and is designated by a numeral ranging from 2 to 30. An approximate molecular weight determination of the complex product was made and found to be about 4000–5000.

It is to be clearly understood that the above formula of the resulting polyurethane is merely illustrative of how the reaction between the bisphenol compound and diisocyanate may go. A specific and precise structural formulation cannot be given at the present time in view of the fact that in addition to the linking of the diisocyanate with the bisphenol compound, considerable cross-linking will also take place to yield a polymeric structure which would be exceedingly difficult to exemplify by a specific configuration. Regardless of the structure, our prime interest, which is the essence of the present invention, are the polyurethanes resulting from the condensation of 1 mole of the polyalkoxy acetal-bisphenol compound with 1 to 4 moles of any one of the above illustrated organic di- and poly-isocyanates or their obvious equivalents. All of the resulting polyurethanes have new and valuable properties and may be employed in the preparation of foams, rubbers, adhesives, surface coatings and many other applications.

*Example II*

1.75 moles of methylene-bis (4-phenylisocyanate) and 1 mole of the bisphenol of Example II of the aforementioned application were dissolved in a sufficient quantity of 99% purity ethyl acetate to give a 50% by weight solution. To the solution was added 0.1% of N-ethyl morpholine based on the solid content. The solution when cast on any conventional casting surface, and after drying, yields tough films. The same tough films are obtained when the cast solution is heated, after evaporation of the solvent, for 15 minutes at 300° F.

*Example III*

2.2 moles of hexamethylene diisocyanate and 1 mole of Example III of the aforementioned application were dissolved in 99% purity ethyl acetate to give a solution containing 60% by weight of non-volatile material. To the resulting solution were added 0.2% by weight of N-methyl morpholine. The solution when cast into films, after drying of the solvent, yielded tough flexible films having good adhesion and water resistance. The solution may be cast upon a clean steel surface or glass and after evaporation of the solvent baked for 25 minutes at 300° F. to yield tough flexible films displaying unusual water resistance.

*Example IV*

2.1 moles of a commercial blend of diisocyanate consisting of 65 parts by weight of 2,4-toluene diisocyanate and 35 parts by weight of 2,6-toluene diisocyanate and 1 mole of bisphenol of Example IV of the aforementioned application were dissolved in 99% pure ethyl acetate to yield a solution containing 50% of non-volatile material. To the solution were added 0.1% by weight of dioctyl ethanolamine. Films deposited from this solution on a clean steel surface showed excellent flexibility, good adhesion and water resistance.

*Example V*

2.2 moles of a commercially available polymethylene polyphenylisocyanate and 1 mole of bisphenol of Example V of the aforementioned application were dissolved in 99% pure ethyl acetate to yield a solution containing 50% by weight of non-volatile material. To the resulting solution there were added 0.2% by weight of N-methyl morpholine. Films were then deposited from the solution on a clean glass surface and baked for 30 minutes at 300° F. The resulting film showed toughness, flexibility, good adhesion and water resistance.

*Example VI*

2.1 moles of dianisidine diisocyanate and 1 mole of the bisphenol of Example VI of the aforementioned application were dissolved in cellulose acetate to yield a solution containing 60% by weight of non-volatile material. To the solution there were then added 0.2% by weight of N-methyl morpholine. Films deposited from this solution on clean steel plates and baked for 25 minutes at 300° F. yielded tough, flexible and water-resistant films displaying unusual adhesitivity.

*Example VII*

15 parts by weight of the bisphenol of Example I of the aforementioned application and 12 parts by weight of a 65/35 mixture of 2,4- and 2,6-toluene diisocyanate were warmed to 50° C. and stirred continuously until a clear solution was formed. The solution was then quickly cooled to room temperature and a blend consisting of 1 part by weight of water and 0.2 part by weight of N-ethyl morpholine added. The blended mixture began to immediately foam and yielded a rigid foam after curing at 50° C. in the conventional manner.

*Example VIII*

100 parts by weight of polypropylene glycol having a molecular weight of 2025, 9.1 parts by weight of a 65/35 mixture of 2,4- and 2,6-toluene diisocyanate and 0.1 part by weight of N-ethyl morpholine were blended at room temperature and the blend heated to 55° C. in 25 minutes. The heated mixture was then held for 2 hours in a dry atmosphere while excluding moisture. To the mixture was then added 110 parts of the bisphenol of Example VIII of the aforementioned application and the mixture stirred until a cool solution was obtained. The solution was immediately cooled to room temperature and a blend consisting of 5 parts by weight of water and 4 parts of N-ethyl morpholine added. The blended mixture began to foam immediately thus indicating an exothermic reaction. After 1 hour there was obtained a light weight flexible foam.

We claim:

1. A polyurethane of a polyalkoxy acetal-bisphenol obtained by reacting 1 to 4 moles of an organic poly-isocyanate with 1 mole of a bisphenol compound having the following general formula:

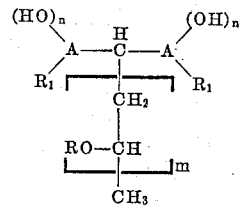

wherein A is the residue after removal of $n+2$ nuclear hydrogens from a compound selected from the group consisting of benzene, diphenyl, naphthalene and anthracene, R represents an alkyl radical of 1 to 5 carbon atoms, $R_1$ represents a member selected from the group consisting of hydrogen, and an alkyl group containing from 1 to 18 carbon atoms, $m$ represents a positive integer of from 2 to 30 and $n$ represents a positive integer of from 1 to 3, $n$ being 1 to 3 when A is phenyl, 1 to 2 when A is selected from the group consisting of diphenyl and naphthyl and 1 only when A is anthracyl.

2. A polyurethane of a polyalkoxy acetal-bisphenol obtained by reacting 1.75 moles of methylene-bis(4-phenylisocyanate) with 1 mole of a polyalkoxy acetal-bisphenol having the following formula:

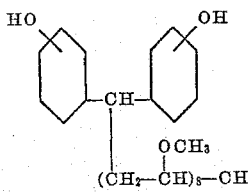

3. A polyurethane of a polyalkoxy acetal bisphenol obtained by reacting 2.2 moles of hexamethylene diisocyanate with 1 mole of a polyalkoxy acetal-bisphenol having the following formula:

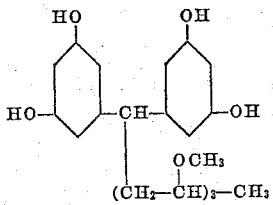

4. A polyurethane of a polyalkoxy acetal-bisphenol obtained by reacting 2.1 moles of a mixture of 65 parts by weight of 2,4-toluene diisocyanate and 35 parts by weight of 2,6-toluene diisocyanate with 1 mole of a polyalkoxy acetal-bisphenol having the following formula:

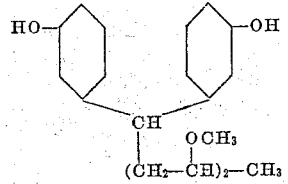

5. A polyurethane of a polyalkoxy acetal-bisphenol obtained by reacting 2.2 moles of polymethylene polyphenylisocyanate with 1 mole of a polyalkoxy acetal-bisphenol having the following formula:

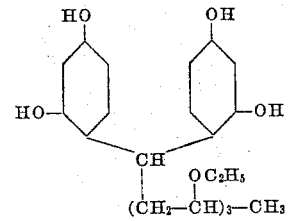

6. A polyurethane of a polyalkoxy acetal-bisphenol obtained by reacting 2.1 moles of dianisidine diisocyanate with 1 mole of a polyalkoxy acetal-bisphenol having the following formula:

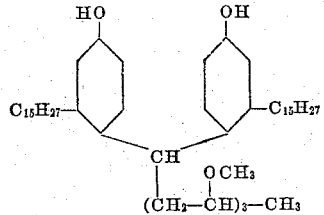

References Cited in the file of this patent

UNITED STATES PATENTS

| | | |
|---|---|---|
| 2,284,637 | Catlin | June 2, 1942 |

FOREIGN PATENTS

| | | |
|---|---|---|
| 901,768 | France | Nov. 13, 1944 |
| 880,486 | Germany | June 22, 1953 |